United States Patent
Dezonno

(10) Patent No.: US 8,073,130 B2
(45) Date of Patent: Dec. 6, 2011

(54) CUSTOMER AUTOMATED RESPONSE SYSTEM

(75) Inventor: Anthony J. Dezonno, Bloomingdale, IL (US)

(73) Assignee: Aspect Software, Inc., Lombard, IL (US)

( * ) Notice: Subject to any disclaimer, the term of this patent is extended or adjusted under 35 U.S.C. 154(b) by 1101 days.

(21) Appl. No.: 10/900,842

(22) Filed: Jul. 28, 2004

(65) Prior Publication Data

US 2006/0023866 A1    Feb. 2, 2006

(51) Int. Cl.
*H04M 3/00* (2006.01)
(52) U.S. Cl. ............................... 379/265.02; 379/265.09
(58) Field of Classification Search ............. 379/265.02, 379/265.09
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,918,222 A * | 6/1999 | Fukui et al. | 707/1 |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 5,991,737 A | 11/1999 | Chen | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,188,761 B1 | 2/2001 | Dickerman et al. | |
| 6,345,305 B1 | 2/2002 | Beck et al. | |
| 6,373,836 B1 | 4/2002 | Deryugin et al. | |
| 6,377,944 B1 * | 4/2002 | Busey et al. | 707/3 |
| 6,389,007 B1 | 5/2002 | Shenkman et al. | |
| 6,393,015 B1 | 5/2002 | Shtivelman | |
| 6,732,156 B2 | 5/2004 | Miloslavsky | |
| 2002/0062269 A1 | 5/2002 | Kirmani et al. | |
| 2003/0212637 A1 | 11/2003 | Turner | |
| 2004/0093230 A1 | 5/2004 | Deogard | |
| 2005/0152529 A1 * | 7/2005 | Kumar et al. | 379/265.02 |
| 2005/0216269 A1 * | 9/2005 | Scahill et al. | 704/270.1 |

* cited by examiner

*Primary Examiner* — Rasha Al Aubaidi
(74) *Attorney, Agent, or Firm* — Husch Blackwell LLP

(57) ABSTRACT

A method and apparatus are provided for prompting an agent of an automatic contact distributor during a customer service contact with a client. The method includes the steps of detecting a state of the customer service contact with the client via operation of a terminal of the agent; selecting a set of possible responses for use by the agent from a plurality of sets of possible responses that are appropriate to the detected state of the customer service contact and visually prompting the agent with the selected set of possible responses.

30 Claims, 3 Drawing Sheets

ID OF THE INVENTION

The field of the invention relates to communication systems and, more particularly, to call centers.

BACKGROUND OF THE INVENTION

Automatic call distributors (ACDs) are known. Such systems are typically used by organizations to serve large numbers of callers through the Public Switched Telephone Network (PSTN). Typically, inbound calls are directed to a common telephone number of the organization and distributed to agents based upon some criteria (e.g., agent idle time).

In addition to handling inbound calls, ACDs may also process outbound calls. Typically, a controller monitors a workload of its agents. Where a workload of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, prepared sales presentations may be displayed on a terminal of the agent that guides the agent through a sales presentation. DNIS information may be used to identify an intended call target and to select an appropriate sales presentation for use by the agent based upon the intended call target.

While prepared sales presentations work relatively well, they are generally only useful in a selling environment. In other situations, such as for customer service, a sales presentation is not appropriate. In these situations, a written format is not helpful because resolution of customer problems do not typically follow predictable paths. Because of the importance of customer service, a need exists for a method of handling customer service calls that is adaptable to the uncertainty of the customer interaction.

SUMMARY

A method and apparatus are provided for prompting an agent of an automatic contact distributor during a customer service contact with a client. The method includes the steps of detecting a state of the customer service contact with the client via operation of a terminal of the agent; selecting a set of possible responses for use by the agent from a plurality of sets of possible responses that are appropriate to the detected state of the customer service contact and visually prompting the agent with the selected set of possible responses.

DETAILED DESCRIPTION OF AN ILLUSTRATED EMBODIMENT

Figure 1:
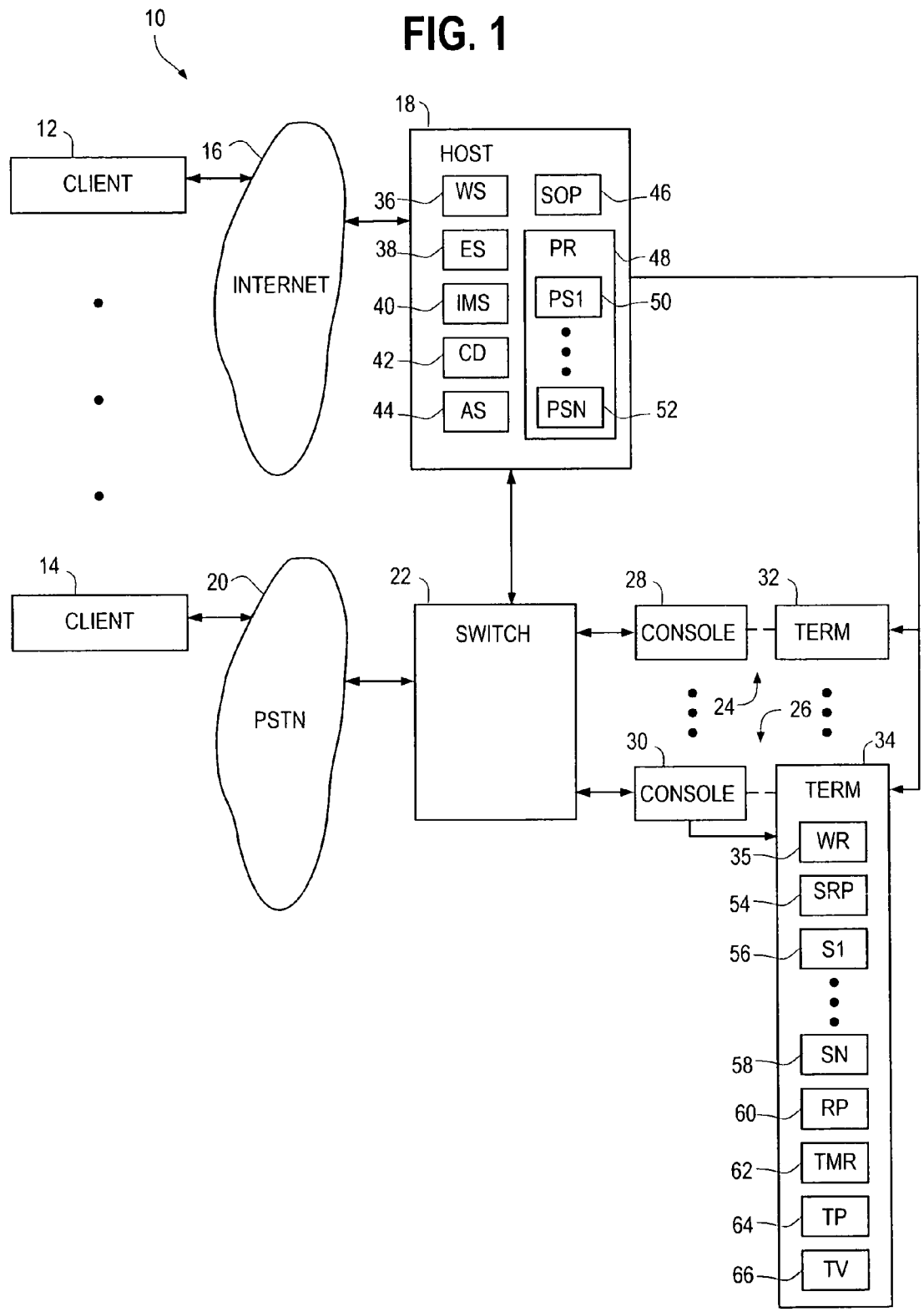
FIG. 1 is a block diagram of an automatic contact distribution system providing agent prompting under an illustrated embodiment of the invention.

FIG. 1 is a block diagram of an automatic contact distribution system 10 shown generally in accordance with an illustrated embodiment of the invention. In general, the system 10 may be used by any of a number of different enterprise organizations (e.g., commercial, environmental, political, etc.) to advance the agenda of the enterprise. The contact distribution system may be used by the organization for establishing contacts through the Internet 16 or the public switch telephone network (PSTN) between clients 14, 16 and agents of the organizations through one or more agent work stations 18, 20.

In order to promulgate the agenda of the organization to its clients 12, 14, the organization may publish contact information (e.g., telephone numbers, e-mail addresses, instant message (IM) addresses or universal resource locators (URLs)), by advertising or otherwise, that identifies a communication path to the organization. The organization may also operate an Internet server that posts pop-up ads to web site visitors. Alternatively, the organization may purchase telephone lists or use its own internal customer lists to perform outgoing marketing campaigns.

Included within the system 10 may be a host 18 and a switch 22 that distributes switched circuit calls with clients 12, 14 to the agent stations (agents) 24, 26. The host 18 may include one or more contact servers (e.g., a web site 36, an e-mail server 38, an instant messaging server 40, etc.) that may process internet calls.

In general, contacts may be connected to agents 24, 26 based upon a context of the call (e.g., the target of the contact, the identity of the caller, the availability and skills of any signed-in agents, etc.). The context of a call may be determined by contact associated information (e.g., DNIS, ANI, source/target URL, source/target e-mail address, etc.).

In order to match a context of a contact with an agent, the system 10 may classify the contact into one of a number of call types. In the case where the contact is initiated from within the system 10, the organization may use its own internal data to classify the contact and to identify an agent 24, 26 to handle the contact. In the case of incoming contacts, the organization may use contact associated information. For example, in the case where the organization is a manufacturer with many different products, a different path identifier (e.g., telephone number, URL, e-mail address, etc.) may be provided for each different product line.

In the case of e-mails, the e-mail server 38 may receive e-mails directed to many different addresses that are all within one or more domain names used by the e-mail server 38. The use of different destination addresses may be used to provide the system 10 with a first level indication of the contact type. The IM server 40, web site server 36 and telephone switch 22 may be used in a similar manner.

Once a contact has been classified into a particular contact type, a contact distributor 42 may match the type of the contact with a skill of an agent 24, 26. In this regard, the host 18 may be provided with a skills list that includes a list of skills for each agent 24, 26 and a list of skills required for each call type.

The call distributor 42 may match a contact with an available agent using any appropriate criteria. For example, incoming calls may be matched (and distributed to) the agent that is the best skilled for the call or the agent that has the been available the longest. In this regard, Internet calls (e.g., e-mails, instant messages, etc.) may be distributed thorough a terminal 32, 34 of the agent station 24, 26. Telephone calls may be routed to a telephone console 28, 30 of the agent station 24, 26.

Figure 2:
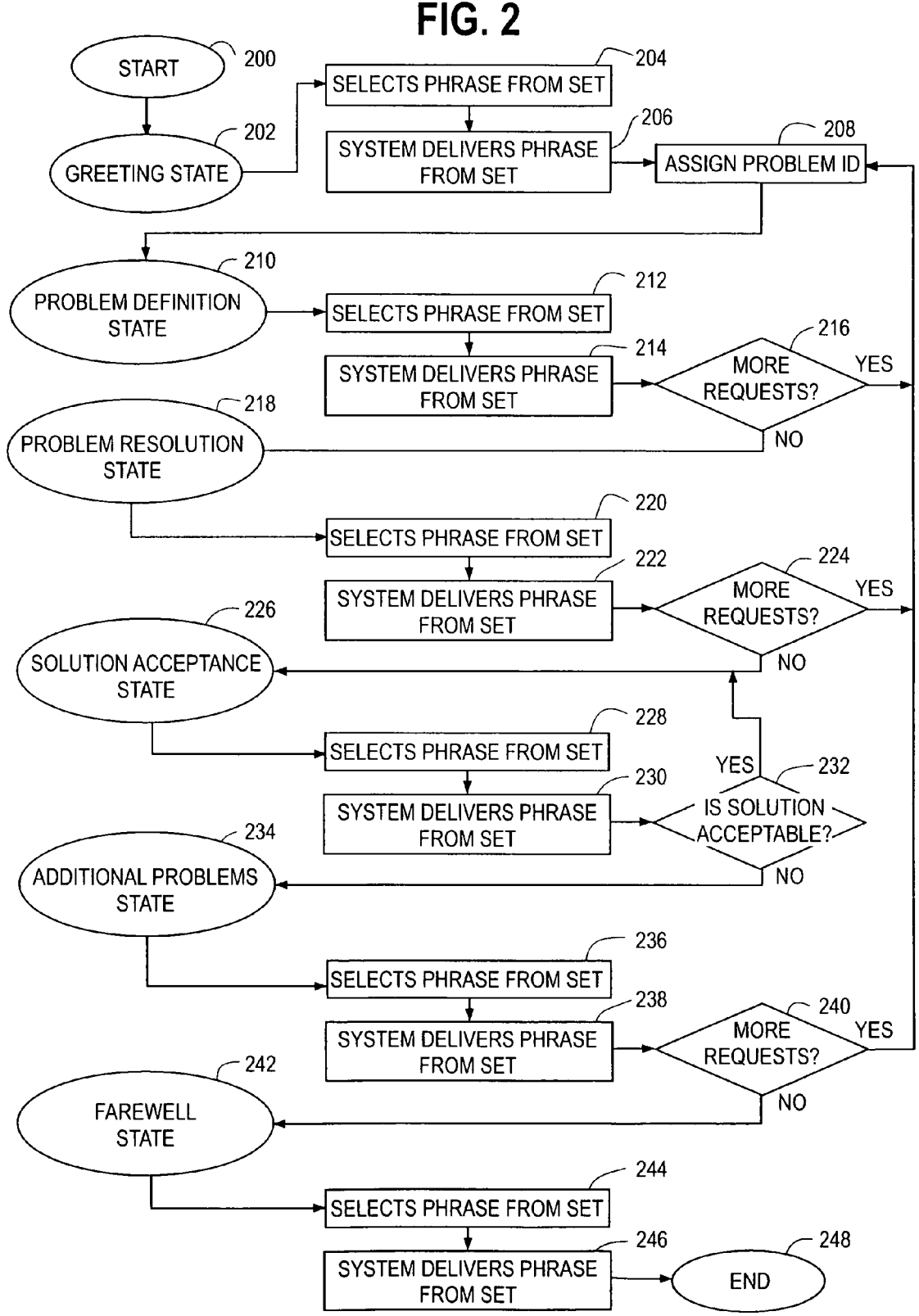
FIG. 2 is a flow chart of contact states of the customer contact that may be used by the system of FIG. 1.

Once the contact has been distributed to the agent 24, 26, the agent may begin to converse with the client 12, 14. In this regard, a novel process will be described for guiding the agent through the transaction. As shown in the flow chart of FIG. 2, a transaction between a client 12, 14 and an agent 24, 26 may have at least five states: 1) a greeting state; 2) a problem definition state; 3) a problem resolution state; 4) a solution acceptance state and 5) a farewell state. As is also shown in FIG. 2, the transaction may have additional states based upon the number of problems to be resolved.

Under illustrated embodiments of the invention, a state display processor 46 within the host 18 (or agent terminal 24, 26) detects the state of the contact through operation of the agent terminal 32, 34 and displays prompts from one of a set of state files 50, 52 (located in the host 18 or terminal 32, 34) on a display of the terminal 32, 34 for the benefit of an agent 24, 26. The display of prompts in a customer service environment is different than scripting in a sales environment because the prompting used in a customer service environment is general in nature and is primarily focused upon supporting a current state of the conversation, with only a secondary objective of moving the conversation towards completion. In contrast, a sales presentation is first and foremost structured towards moving the listener towards completing a sale. This difference is significant because in a customer service environment a customer must be allowed to fully vent his concerns and for a solution to be found and agreed-upon in order for a contact to be successful.

Shown below in Table I is an exemplary set of prompting sentences and phrases and a related state within which the prompting sentence or phrase may be used.

TABLE I

| | |
|---|---|
| Is there anything else I can do for you? | Add Problems |
| We value your business and want to resolve this quickly for you. | Farewell |
| Thanks for bringing this to our attention. | Farewell |
| We value our customer's input. I'll pass your comments on. | Farewell |
| I'll take care of that right away. | Farewell |
| I'm glad I could help you. | Farewell |
| We appreciate your business, please call again. | Farewell |
| Yes. | General |
| I agree. | General |
| I'm here to help you. | General |
| You're right. | General |
| I see what you mean. | General |
| Thank you for being so patient. | General |
| I know exactly what you mean. | General |
| You're welcome. | General |
| How can we help you today? | Greeting |
| Hello. | Greeting |
| I am sorry for your inconvenience. | Problem Definition |
| Please tell me what happened. | Problem Definition |
| How can I help? | Problem Definition |
| I appreciate what you are saying. | Problem Definition |
| Let me write this down so I have it right. | Problem Definition |
| I am sure we can find a solution. No problem. | Problem Definition |
| We'll make it right. | Problem |

TABLE I-continued

| | |
|---|---|
| | Definition |
| Let me see if I understand this correctly . . . | Problem Definition |
| How can I help you today? | Problem Definition |
| I'm sorry there is a problem. We'll make it right. | Problem Definition |
| Let me make sure I have this correct . . . | Problem Definition |
| What seems to be the problem? | Problem Definition |
| What can we do to make you happy? | Problem Resolution |
| Now wonder you are feeling frustrated. | Problem Resolution |
| Let's get this resolved. | Problem Resolution |
| I'd be glad to do that. | Problem Resolution |
| I'll find out for you right away. | Problem Resolution |
| What do you think is a fair way to settle this? | Problem Resolution |
| I'll go to work on this immediately. | Problem Resolution |
| I'm happy to do that for you. | Problem Resolution |
| I'll get right back to you. | Problem Resolution |
| Let me find out for you. | Problem Resolution |
| Is that all right? | Solution Acceptance |
| Would you like me to review anything for you? | Solution Acceptance |
| Do you have any questions? | Solution Acceptance |

Figure 3:
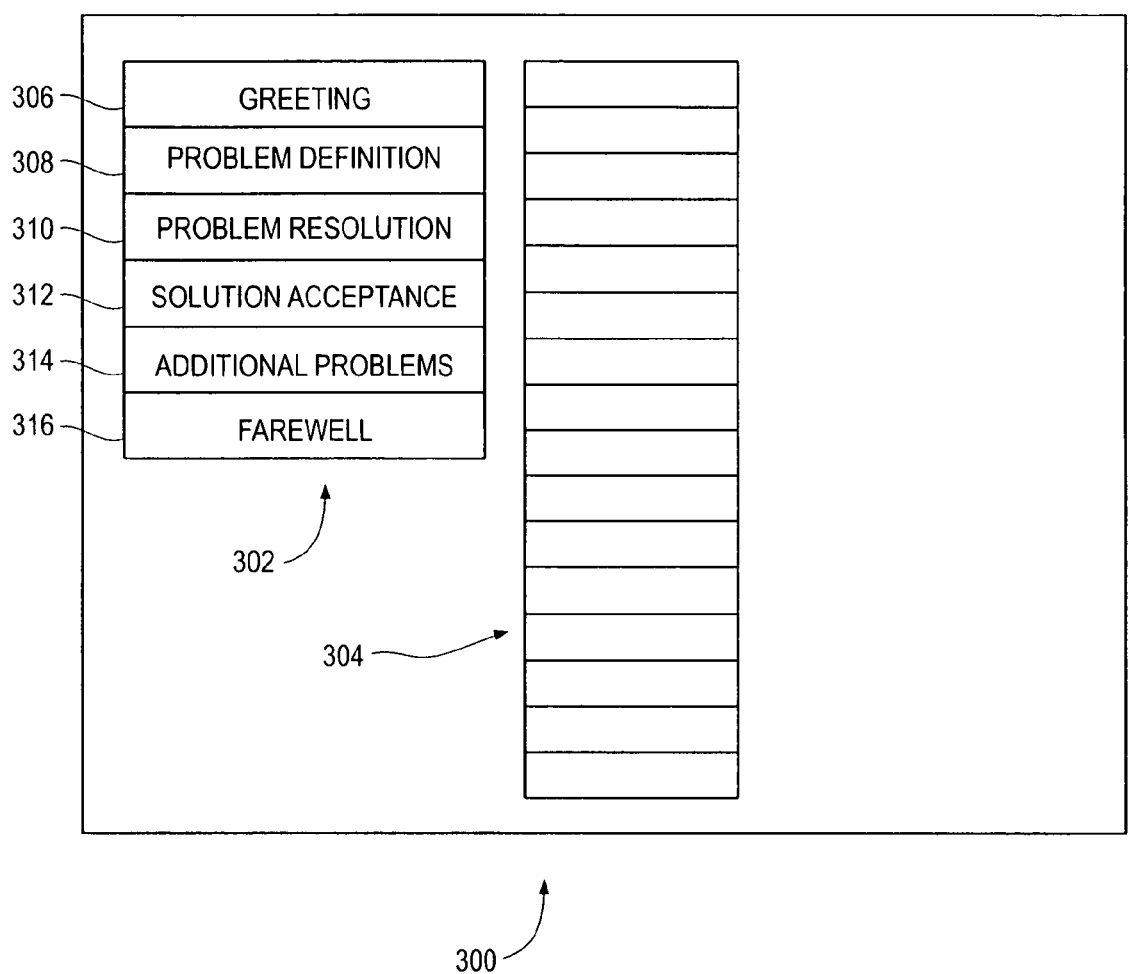
FIG. 3 is a state selection screen that may be used by an agent of the system of FIG. 1.

Determination of the state in which a conversation (i.e., a contact) between an agent and client is in at any particular instant in time may be accomplished by any of a number of different methods. Under one illustrated embodiment (shown in FIG. 3) a display 300 may be provided with a state selection window 302 and a prompting window 304. In this example, the agent 24, 26 may manually indicate a state of the contact by selecting the state (softkey) that best describes that part of the conversation. For example, if the agent 24, 26 should activate the GREETING softkey 306, then a state display processor 46 within the host 18 (or terminal 32, 34) would detect the selected state and cause the terminal 32, 24 to display a number of greeting prompts in the prompting window 304. Similarly, if the agent 24, 26 should activate one of the PROBLEM DEFINITION, PROBLEM RESOLUTION, SOLUTION ACCEPTANCE, ADD PROBLEM or FAREWELL softkeys, then an appropriate set of prompts would appear in the prompting window 304.

In another embodiment of the invention, a word recognition application 35 within the terminal 34 of the agent 24, 26 may recognize the spoken words of the client 12, 14 (and possibly the agent 24, 26) and use the recognized words to select the state of the conversation automatically. In this regard, a state recognition processor 54 may receive the recognized words from the recognition application 35 and match the recognized words with the words within one of a number of state files, where at least one state file is provided for each of the states of the conversation.

For example, one of the state files 56, 58 may be provided for the GREETING state and may contain words indicative of the GREETING state (e.g., hello, hi, etc.). When the word HELLO is detected and matched with the file 56, 58 corresponding to the GREETING state, the state display processor 46 may provide a set of greeting prompts in the prompting window 304.

Similarly detection of one or more words indicative of a product/service espoused by the organization may be taken as indicative of a PROBLEM DEFINITION state and in the display of a set of PROBLEM DEFINITION prompts. Action words (e.g., provide, offer, etc.) may be accepted as indication of a PROBLEM RESOLUTION state and of the need for the display of PROBLEM RESOLUTION prompts. Similar words may be recognized and matched for the SOLUTION ACCEPTANCE and FAREWELL states.

In another illustrated embodiment of the invention, prompting of the agent 24, 26 may be extended to calls under a Voice-over-Internet-Protocol (VoIP). As above, the word recognition application 35 may recognize the spoken words to determine a state and the state display processor 46 may prompt the agent 24, 26, as described above.

In another illustrated embodiment, the agent 24, 26 may be prompted during contacts under an e-mail and IM formats. In this regard, the e-mail server 38 or IM server 40 may receive and classify a contact according to type based upon the contact associated information. The contact may then be distributed to an agent 24, 26 based upon the classification of the contact.

Once assigned to an agent 24, 26, the agent may determine and manually select the state or the text of the e-mail or IM may be transferred to the state recognition processor 54 to determine the state of each exchange. Once a state is determined, the state display processor 46 may display a set of prompts appropriate to the state.

In the case of e-mails and IM, the agent 24, 26 may place a cursor over one of the prompts and activate a switch on a mouse to select the prompt. In turn, a response processor 60 may automatically compose an e-mail or IM response incorporating the selected prompt.

As a more specific example, a customer may initiate a contact to the system 10. The contact may be received and routed to an agent 24, 26 for processing. Upon receipt of the contact by the agent 24, 26, the prompting process may begin 200 (FIG. 2). In this regard, the agent 24, 26 may select the GREETING state via the GREETING softkey 306 or the state may be automatically recognized via the word recognition application 35 and state recognition processor 54.

Upon detection of the GREETING state, the state display processor 46 may prompt the agent 24, 26 with a set of possible greetings. The agent 24, 26 may select 204 a response by reciting the response (if the contact is over a voice channel) or click on the response (if the contact is under an e-mail or IM format).

In response, the system 10 may deliver 206 the selected response as described above. The system 10 may also assign 208 a problem identifier to track multiple problems.

The contact may enter the PROBLEM DEFINITION state via activation of the PROBLEM DEFINITION softkey 308 or via the word recognition application 35 and state recognition processor 54. As above, the agent 24, 26 may select 212 a response by reciting the response (if the contact is over a voice channel) or click on the response (if the contact is under an e-mail or IM format).

The contact may then enter the PROBLEM RESOLUTION state 218 or revert to the ASSIGN PROBLEM ID state 208 and PROBLEM DEFINITION state 210 via activation of the PROBLEM DEFINITION softkey 308 or PROBLEM RESOLUTION softkey 308 or via the word recognition application 35 and state recognition processor 54. If the state reverts to the PROBLEM DEFINITION state, then a new problem identifier is assigned to the new problem and the process repeats. If the client 12, 14 does not raise new issues, then the process may proceed to the PROBLEM RESOLUTION state 218.

Within the PROCESS RESOLUTION state 218, the agent 24, 26 may be presented with a set of prompts to facilitate settlement of the problem. As above, the agent 24, 26 may select 220 a response by reciting the response (if the contact is over a voice channel) or click on the response (if the contact is under an e-mail or IM format).

The contact may then enter the SOLUTION ACCEPTANCE state 226 or revert to the ASSIGN PROBLEM ID state, 208 and PROBLEM DEFINITION state 210 via activation of the PROBLEM DEFINITION softkey 308 or SOLUTION ACCEPTANCE softkey 312 or via the word recognition application 35 and state recognition processor 54. If the state reverts to the PROBLEM DEFINITION state, then a new problem identifier is assigned to the new problem and the process repeats. If the client 12, 14 does not raise new issues, then the process may proceed to the SOLUTION ACCEPTANCE state 226.

Within the SOLUTION ACCEPTANCE state 226, the agent 24, 26 may be presented with a set of prompts to confirm acceptance of the solution. As above, the agent 24, 26 may select 228 a response by reciting the response (if the contact is over a voice channel) or click on the response (if the contact is under an e-mail or IM format).

If the solution is acceptable 232, the contact may then enter the ADDITIONAL PROBLEMS state 234 or revert to the SOLUTION ACCEPTANCE state via activation of the SOLUTION ACCEPTANCE softkey 226 or via the word recognition application 35 and state recognition processor 54. If the state reverts to the SOLUTION ACCEPTANCE state, then the agent 24, 26 may select a new prompt and the process repeats.

If the client 12, 14 indicates that the solution is acceptable, then the process proceeds to the ADDITIONAL PROBLEMS state. In the ADDITIONAL PROBLEMS state, the agent 24, 26 may select a sentence or phrase the offers the client 12, 14 the opportunity to express other concerns. If the client 12, 14 makes an additional request 240, then the system 10 assigns 208 a new problem ID and the process repeats.

If the client 12, 14 does not raise any new issues, then the system 10 may enter a FAREWELL state. Within the FAREWELL state, the agent 24, 26 may select a phrase or sentence 244. The system 10 may deliver 246 the response and the process may end.

Under another illustrated embodiment of the invention, a timer 62 within the agent terminal or host monitors the state recognition processor to determine the time that the agent is within each state during the customer service contact. The time of each state may be averaged within a training processor 64 and compared to a set of threshold values 66. If the average time that an agent spends on any particular stage of a customer service contact exceeds the threshold values, then the excess time may be taken as an indicator of a need for training (or re-training) of the agent.

A specific embodiment of method and apparatus for prompting an agent has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of prompting an agent of an automatic contact distributor during a customer service contact with a client where each customer service contact is divided into a plurality of predefined transaction phase states through which the contact passes during the contact, such method comprising the steps of:

automatically detecting each of the transaction phase states of the customer service contact during the contact with the client out of the plurality of predefined transaction phase states via operation of a terminal of the agent;

automatically selecting in response to respective detection of each respective transaction phase state of the plurality of transaction phase states via operation of a selection processor, a respective set of possible responses for use by the agent from a plurality of sets of predetermined possible responses including a plurality of sets of predetermined possible responses appropriate to each respective one of the plurality of predefined transaction phase states, the respective set of possible responses being a plurality of predetermined possible responses each specifically appropriate to the respective detected transaction phase state of the customer service contact and focused primarily upon supporting the respective transaction phase state of the customer service contact; and visually prompting the agent on the terminal of the agent with the respective selected set of possible responses from which the agent may select a response.

2. The method of prompting the agent as in claim 1 wherein the plurality of predefined transaction phase states comprise at least a greeting state, a problem definition state, a problem resolution state, a solution acceptance state, and a farewell state.

3. The method of prompting the agent as in claim 2 further comprising assigning a problem identifier after delivering a greeting in the greeting state and entering the problem definition state, and after the agent selects and delivers a response, assigning a new problem identifier if the problem resolution phase state is not entered.

4. The method of prompting the agent as in claim 3 further comprising an additional problem state.

5. The method of prompting the agent as in claim 2 further comprising selecting a response from the selected set of possible responses, delivering the response selected to the client, and then entering a new transaction phase state.

6. The method of prompting the agent as in claim 1 wherein the step of detecting the transaction phase state of the customer service contact further comprises the terminal detecting activation by the agent of a softkey of a problem statement menu.

7. The method of prompting the agent as in claim 1 wherein the step of automatically detecting the transaction phase state of the customer service contact further comprises a word recognition application within the terminal of the agent recognizing a set of words of the client and automatically determining the transaction phase state of the contact in response thereto.

8. The method of prompting the agent as in claim 7 wherein the step of detecting the state of the customer service contact further comprises matching the recognized words with a predetermined set of words that define each state.

9. The method of prompting the agent as in claim 1 further comprising measuring a time the agent spends in each state of the contact.

10. The method of prompting the agent as in claim 9 further comprising scheduling an agent for re-training when the measured time in a state exceeds a predetermined threshold value.

11. An apparatus for prompting an agent of an automatic contact distributor during a customer service contact with a client where each customer service contact is divided into a plurality of predefined transaction phases, such apparatus comprising:

means for detecting which transaction phase that the customer service contact with the client is in, of the plurality of predefined transaction phases via operation of a terminal of the agent wherein the plurality of predefined transaction phases include a problem definition phase and a problem resolution phase;

means for automatically selecting, in response to respective detection of each respective transaction phase state of the plurality of phase states, a respective set of possible responses for use by the agent from a plurality of sets of possible responses, such that the respective set of possible response selected is a plurality of responses specifically appropriate to the respective detected transaction phase of the customer service contact and focused primarily upon supporting the respective transaction phase state of the customer service contact;

means for visually prompting the agent with the respective selected set of possible responses enabling the agent to select a response; and means for assigning a problem identifier after entering the problem definition phase, and assigning a new problem identifier if the problem resolution phase is not entered after the agent responds.

12. The apparatus for prompting the agent as in claim 11 wherein the plurality of transaction phases comprise at least a greeting phase, a problem definition phase, a problem resolution phase, and a farewell phase.

13. The apparatus for prompting the agent as in claim 12 wherein the plurality of phases further comprise a solution acceptance phase.

14. The apparatus for prompting the agent as in claim 12 further comprising an additional problem phase.

15. The apparatus for prompting the agent as in claim 12 further comprising means for selecting a response from the selected set of possible responses, and means for delivering the response selected to the client.

16. The apparatus for prompting the agent as in claim 11 wherein the means for detecting the transaction phase further comprises means within the terminal for detecting activation of a softkey of a problem statement menu.

17. The apparatus for prompting the agent as in claim 11 wherein the means for detecting the phase of the customer service contact further comprises means within the terminal of the agent for recognizing a set of words of the client and/or automatically determining the transaction phase of the contact in response thereto.

18. The apparatus for prompting the agent as in claim 17 wherein the means for detecting the phase of the customer service contact further comprises means for matching the recognized words with a predetermined set of words that define each phase.

19. The apparatus for prompting the agent as in claim 11 further comprising means for the agent to select a response from the set of responses by activating a switch to select a corresponding prompt, and means for automatically composing a text message incorporating the selected response.

20. The apparatus for prompting the agent as in claim 11 further comprising means for measuring a time the agent spends in a phase and means for scheduling an agent for re-training when the measured time in a phase exceeds a predetermined threshold value.

21. An apparatus for prompting an agent of an automatic contact distributor during a customer service contact with a client where the customer service contact is divided into a plurality of predefined transaction phase states, such apparatus comprising:
- a plurality of prompting files where each prompting file of the plurality of prompting files corresponds to a respective transaction phase state of the plurality of predefined transaction phase states of the customer service contact and each file of the plurality of prompting files contains a plurality of possible responses by the agent to the client each of the plurality of possible responses specifically related to the corresponding respective transaction phase state and focused primarily upon the current phase state of the customer service contact;
- a state detection processor that automatically detects which respective transaction phase state of the plurality of transaction phase states that the customer service contact is in; and
- a state display processor which selects in response to respective detection of each respective transaction phase state of the plurality of transaction phase states, the prompting file that corresponds to the respective detected transaction phase state and displays a window on a terminal of the agent that visually prompts the agent with the plurality of possible responses of the prompting file that corresponds to the respective detected transaction phase state of the customer service contact and that enables the agent to select a response therefrom.

22. The apparatus for prompting the agent as in claim 21 wherein the plurality of states comprise at least a greeting state, a problem definition state, a problem resolution state, and a farewell state.

23. The apparatus for prompting the agent as in claim 22 wherein the plurality of states comprise a solution acceptance state.

24. The apparatus for prompting the agent as in claim 23 wherein the plurality of states further comprises an additional problem state.

25. The apparatus for prompting the agent as in claim 21 further comprising the window enabling selection of a response from the visually prompted set of possible responses, and the terminal enabling delivery of the response selected to the client.

26. The apparatus for prompting the agent as in claim 21 further comprising a state selection window that allows the agent to select the transaction phase state of the customer service contact.

27. The apparatus for prompting the agent as in claim 21 wherein the state detection processor further comprises a word recognition application within the terminal of the agent for recognizing a set of words of the client.

28. The apparatus for prompting the agent as in claim 27 wherein the word recognition application further comprises a predetermined set of words that define each state.

29. The apparatus for prompting the agent as in claim 21 further comprising a timer that measures a time the agent spends in each state of the plurality of states detected by the state recognition processor.

30. The apparatus for prompting the agent as in claim 29 further comprising a training processor that schedules an agent for re-training when the measured time in each state exceeds a predetermined threshold value.

* * * * *